(12) United States Patent
Halbur et al.

(10) Patent No.: US 7,959,068 B2
(45) Date of Patent: Jun. 14, 2011

(54) TRANSACTION PRODUCT WITH GELATINOUS SUBSTANCE

(75) Inventors: Ted C. Halbur, Lino Lakes, MN (US); Adam W. Reynolds, Minneapolis, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 934 days.

(21) Appl. No.: 11/843,855

(22) Filed: Aug. 23, 2007

(65) Prior Publication Data

US 2009/0055253 A1 Feb. 26, 2009

(51) Int. Cl.
*G06Q 40/00* (2006.01)
*G07D 11/00* (2006.01)
*G07F 19/00* (2006.01)

(52) U.S. Cl. .................................... 235/379; 235/380
(58) Field of Classification Search .................. 235/375, 235/380, 487
See application file for complete search history.

(56) References Cited

U.S. PATENT DOCUMENTS

| | | | |
|---|---|---|---|
| 3,061,572 A | 10/1962 | Packer | |
| 4,057,921 A | 11/1977 | Ball | |
| 4,395,835 A | 8/1983 | Schneider | |
| 5,088,598 A | 2/1992 | Iguchi | |
| 5,256,457 A | 10/1993 | Pantaleo et al. | |
| 5,871,096 A | 2/1999 | Yakich | |
| 5,958,525 A | 9/1999 | Green et al. | |
| 6,348,534 B1 | 2/2002 | Bianco | |
| 6,484,425 B1 | 11/2002 | Hirsch | |
| 6,620,019 B1 | 9/2003 | Kuo | |
| 6,808,514 B2 | 10/2004 | Schnedier et al. | |
| 7,004,398 B1* | 2/2006 | Francis et al. | 235/486 |
| 7,163,101 B2 | 1/2007 | Harper | |
| 2002/0088855 A1* | 7/2002 | Hodes | 235/385 |
| 2002/0143697 A1 | 10/2002 | Gotfried | |
| 2006/0010737 A1 | 1/2006 | Lee | |
| 2007/0194128 A1 | 8/2007 | Coe et al. | |

OTHER PUBLICATIONS

Content from www.sillyputty.com; obtained from www.archive.org from Aug. 3, 2006; all attached content is pertinent.*
Casassa, et al., "The Gelation of Polyvinyl Alcohol with Borax", Jan. 1986, vol. 63, No. 1, pp. 57-59.*
"Galaxy Slime," http://www.windycitynovelties.com/Epaysoft/cart/product.asp?ITEM_ID=6870&CatID=314&s_cid=PGR6870&ovchn=PGR&ovcpn=Pr..., printed on May 8, 2007, 3 pages.
"Stored-Value Product With Housed Article," U.S. Appl. No. 11/697,271, filed Apr. 5, 2007.
"Stored-Value Card With Housed Object," U.S. Appl. No. 11/404,584, filed Apr. 14, 2006.
"Stored-Value Card With Bubble Wand," U.S. Appl. No. 11/404,367, filed Apr. 14, 2006.
"Stored-Value Card With Chemical Luminescence," U.S. Appl. No. 11/510,264, filed Aug. 25, 2006.

* cited by examiner

*Primary Examiner* — Thien M. Le
*Assistant Examiner* — Christopher Stanford
(74) *Attorney, Agent, or Firm* — Griffiths & Seaton PLLC

(57) ABSTRACT

A transaction product includes a housing, a gelatinous substance and an account identifier. The housing defines a storage cavity and is configured to be selectively opened and closed to provide selective access to the storage cavity. The gelatinous substance is selectively enclosed within the storage cavity, and, upon removal of the gelatinous substance from the storage cavity, the gelatinous substance is configured to selectively flow in a plurality of different directions. The account identifier links the transaction product to at least one of an account and a record and is machine readable by a point-of-sale terminal such that value can be added to or deducted from the at least one of the account and the record using the account identifier. Other product, cards, assemblies and associated methods are also disclosed.

24 Claims, 10 Drawing Sheets

US 7,959,068 B2

TRANSACTION PRODUCT WITH GELATINOUS SUBSTANCE

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY OF THE INVENTION

One aspect of the present invention relates to a transaction product including a housing, a gelatinous substance and an account identifier. The housing defines a storage cavity and is configured to be selectively opened and closed to provide selective access to the storage cavity. The gelatinous substance is selectively enclosed within the storage cavity, and, upon removal of the gelatinous substance from the storage cavity, the gelatinous substance is configured to selectively flow in a plurality of different directions. The account identifier links the transaction product to at least one of an account and a record and is machine readable by a point-of-sale terminal such that value can be added to or deducted from the at least one of the account and the record using the account identifier. Other related products, assemblies and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
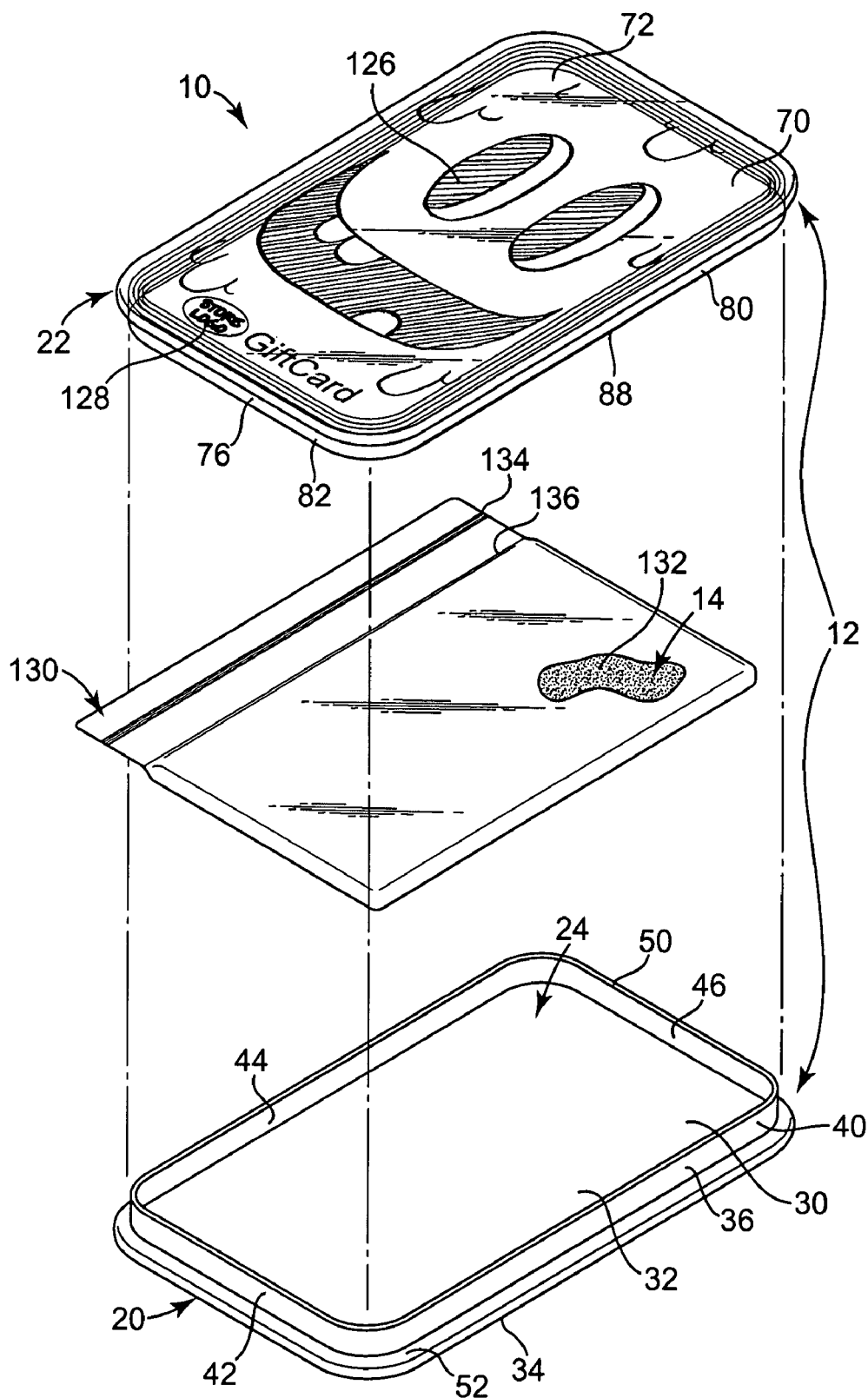
FIG. 1 is an exploded perspective view illustration of a transaction product, according to one embodiment of the present invention.

A stored-value card and other transaction products are adapted for making purchases of goods and/or services at, for example, a retail store or website and/or for storing non-monetary value adapted for redemption toward the use of goods and/or services (e.g., a phone card). According to one embodiment, an original consumer buys a transaction product to give a recipient who in turn is able to use the transaction product at a retail store or setting to pay for the goods and/or services. A transaction product, according to embodiments of the present invention, provides the consumer and recipient with extra amusement in addition to the ability to pay for goods and/or services with the transaction product.

In particular, in one embodiment, the transaction product includes a housing storing a gelatinous article or substance (e.g., a free-flowing gel material), which can be removed from the housing and played with by a bearer of the transaction product. The viscous and sticky nature of the gelatinous article generally serves to amuse the bearer. Once the bearer has finished playing with the gelatinous article, at least for a period of time, the gelatinous article can be replaced within the housing. The housing is configured to be repeatedly hermetically sealed such that the gelatinous article stored therein is protected from the environment to decrease or delay drying out or other environmental degradation of the gelatinous article. As such, the gelatinous article can be repeatedly removed from the housing for play and replaced within the housing for storage as desired by the bearer of the transaction product. In one example, this amusing aspect of the transaction product and the anticipation of such amusement for a potential consumer or as imagined for a potential recipient encourages the potential consumer to purchase and/or load value onto the transaction product.

Turning to the figures, FIGS. 1-6 illustrate a transaction product 10 such as a stored-value card or financial transaction card according to one embodiment of the present invention. In particular, in one embodiment, transaction product 10 includes a housing 12 and a substance or article 14 (FIG. 1) substantially enclosed or otherwise stored therein. Transaction product 10, or more particularly, housing 12 is linked with an account or record and provides means for accessing the monetary funds or non-monetary funds (e.g., prepaid calling minutes or points) associated with the account or record for paying for goods and/or services, for use toward calling minutes, for use of points toward a purchase, etc.

In one embodiment, housing 12 is substantially rigid and includes a first housing member or base 20 and a second housing member or cover 22. Base 20 and cover 22 are configured to be selectively coupled to one another to define a storage cavity 24 therebetween. One embodiment of base 20 is illustrated, for example, in FIGS. 1 and 4. Base 20 generally includes a major or a primary panel 30, which, in one embodiment, is substantially planar and defines an inside surface 32 and an outside surface 34 (FIG. 4) opposite inside surface 32. In one embodiment, primary panel 30 is generally rectangular and sized similarly to an identification card, a credit card or other card sized to fit in a wallet of a user. In other embodiments, primary panel 30 is otherwise shaped as a square, circle, oval, star or any other suitable shape.

In one example, base 20 additionally includes a side wall 36 extending from inside surface 32 away from outside surface 34. In one embodiment, side wall 36 extends from and is positioned relative to inside surface 32 slightly offset radially inwardly from an outer perimeter of primary panel 30. As such, in one example, primary panel 30 radially extends outwardly beyond side wall 36 such that a lip 52 is defined by base 20 around side wall 36. In one embodiment, side wall 36 extends away from inside surface 32 with a substantially perpendicular orientation relative to primary panel 30 and defines four substantially linear side wall segments 40, 42, 44 and 46. In particular, first side wall segment 40 extends substantially parallel to and is positioned opposite third side wall segment 44. Second side wall segment 42 and fourth side wall segment 46 each extend between first side wall segment 40 and third side wall segment 44 and are positioned opposite and substantially parallel to one another. Side wall 36 extends from primary panel 30 to define an inside edge 50 opposite primary panel 30. In one embodiment, side wall 36 forms curved or chamfered corners at the intersection of each side wall segment 40, 42, 44 and 46 with another one of side wall segments 40, 42, 44 and 46.

Figure 7:
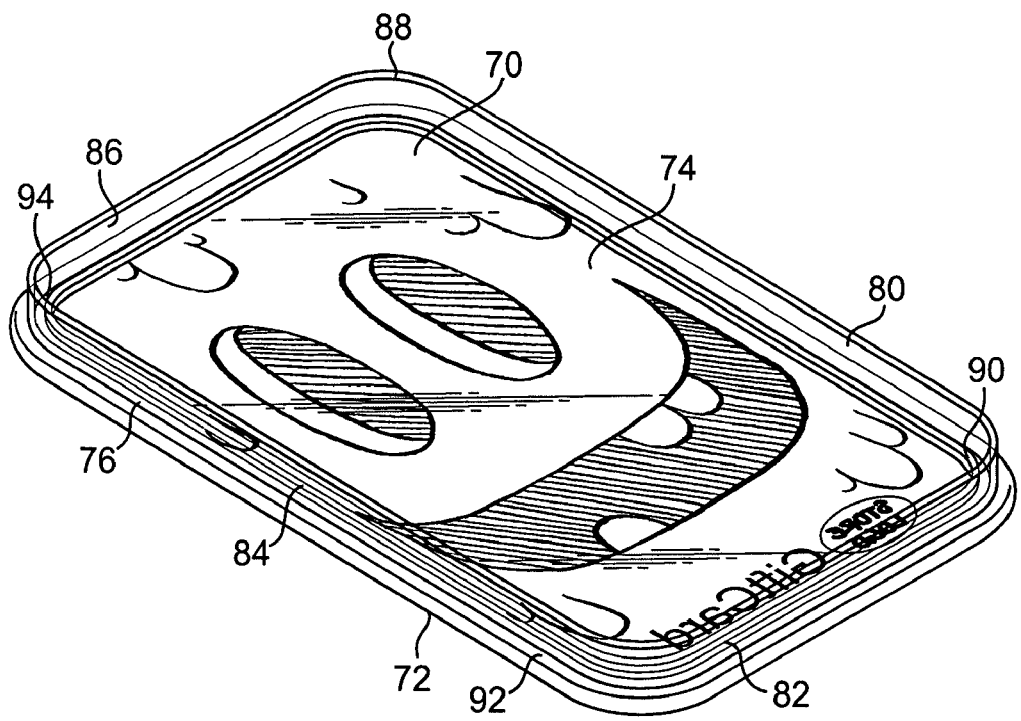
FIG. 7 is an inside perspective view illustration of a second housing member of the transaction product of FIG. 1, according to one embodiment of the present invention.

Referring to FIGS. 1 and 7, in one embodiment, cover 22 includes a major or a primary panel 70, which, in one example, is substantially planar and defines an outside surface 72 and an inside surface 74 opposite outside surface 72. In one embodiment, primary panel 70 is substantially sized and shaped similarly to primary panel 30 of base 20.

Cover 22 includes a side wall 76 extending from inside surface 74 of cover 22 away from outside surface 72. In one embodiment, side wall 76 extends from and is positioned relative to inside surface 74 slightly offset radially inward from an outer perimeter of primary panel 70 to define a lip 92 as a portion of primary panel 70 extending radially outwardly from side wall 76. More specifically, in one example, side wall 76 is inwardly offset from the outer perimeter of primary panel 70 slightly less than side wall 36 is inwardly offset from the outer perimeter of primary panel 30. In one example, side wall 76 extends from and is not inwardly offset from the outer perimeter of primary panel 30.

In one embodiment, side wall 76 extends away from inside surface 74 with a substantially perpendicular orientation relative to primary panel 70 and with a distance substantially equal to a distance side wall 36 of base 20 extends from inside surface 32. In one example, side wall 76 generally defines four substantially linear side wall segments 80, 82, 84 and 86. In particular, first side wall segment 80 extends substantially parallel to and is positioned opposite third side wall segment 84. Second side wall segment 82 and fourth side wall segment 86 each extend between first side wall segment 80 and third side wall segment 84 and are positioned opposite and substantially parallel to one another. In one example, side wall 76 extends from primary panel 70 to define an inside edge 88 opposite primary panel 70.

Figure 8:
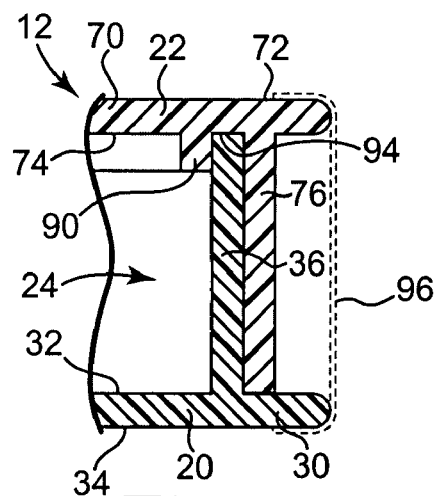
FIG. 8 is a cross-sectional view of a portion of the transaction product of FIG. 3 taken along the line X-X, according to one embodiment of the present invention.

In one example, a rib 90 (FIGS. 7 and 8) extends from inside surface 74 of primary panel 70. Rib 90 extends from inside surface 74 in a similar manner as side wall 76 extends therefrom, however, rib 90 is inwardly offset from side wall 76 to define a groove 94 therebetween (FIGS. 7 and 8). As such, rib 90 extends away from inside surface 74 with a substantially perpendicular orientation relative to primary panel 70. In one embodiment, rib 90 extends from inside surface 74 a smaller distance than side wall 76 extends from inside surface 74. In one example, rib 90 is inwardly offset from side wall 76 a distance substantially equal to or just slightly larger than a thickness of side wall 36 of base 20 such that upon assembly of housing 12, side wall 36 of base is received within groove 94 (i.e., between side wall 76 and rib 90 of cover 22) as will be further described below.

In one embodiment, each of base 20 and cover 22 is formed by injection molding plastic (e.g. polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of base 20 and cover 22. In one embodiment, one of base 20 and cover 22 is formed of translucent polyethylene which is specifically configured to facilitate formation of a hermetic and/or air tight seal between base 20 and cover 22. Other methods of forming base 20 and cover 22 are also contemplated. In one example, base 20 and cover 22 are each formed of materials having a similar or identical color. In other examples, base 20 and cover 22 can be formed of materials having different coloring. For example, in one embodiment, base 20 is formed of opaque material while cover 22 is substantially transparent or substantially translucent.

In one embodiment, to assemble or close housing 12, cover 22 is configured to be coupled with and to at least partially fit around a portion of base 20. More particularly, base 20 and cover 22 interact such that primary panels 70 and 30 are substantially parallel to one another and side wall 76 of cover 22 substantially wraps around side wall 36 of base 20 (i.e., extends around an outer perimeter of side wall 36). In one example, when assembled, side wall 36 fits partially within groove 94 of cover 22, and inside edge 88 of cover 22 interfaces with primary panel 30 of base 20, more particularly, with lip 92. Similarly, inside edge 50 of base 20 interfaces with primary panel 70 of cover 22, more particularly, with lip 52. As such, lips 52 and 92 each function as a stop to limit further movement of cover 22 onto base 20 and vice versa.

In one embodiment, the interaction between base 20 and cover 22 is configured to hermetically seal housing 12 when housing 12 is closed (e.g., when base 20 is fully coupled with cover 22). Formation of a hermetic seal protects article 14 stored within housing 12 from environmental factors that could otherwise degrade or decrease the lifespan of article 14. For instance, as will be further described below, by hermetically sealing housing 12, an at least partially liquid article 14 (e.g., a gelatinous article) is protected such that article 14 will not dry out or drying out of article 14 will at least be significantly delayed. As such, the useful life of article 14 is increased. In one example, housing 12 is hermetically sealed due at least in part to the tight friction fit of side wall 36 with side wall 76 upon coupling of base 20 and cover 22. In one embodiment, the hermetic seal of housing 12 is sufficient to protect article 14 from drying out after exposure of transaction product 10 to 170° F. for 168 continuous hours.

Other suitable manners of coupling base 20 and cover 22 are also contemplated and will be apparent to those with skill in the art upon reading the present application. For example, although cover 22 is primarily described herein as receiving and extending around base 20, in one embodiment, base 20 receives and extends around cover 22. In one embodiment, for initial packaging, a shrink wrap or adhesive seal (e.g., made of plastic or other suitable material), as generally indicated at 96 in FIG. 8 with broken lines, is applied to extend between base 20 and cover 22 when housing 12 is closed about at least a portion of an outer perimeter of housing 12 as generally indicated in broken lines in FIG. 8. Seal 96 is configured to be easily removed from housing 12 following purchase of transaction product 10.

Figure 9:
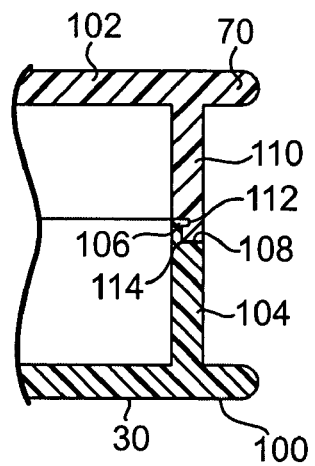
FIG. 9 is an alternative to the cross-sectional view of FIG. 8, according to one embodiment of the present invention.

In one embodiment, housing 12 includes the alternative coupling illustrated in the cross-sectional view of FIG. 9. For example, the alternative coupling is formed by a base 100 and a cover 102, which are substantially similar to base 20 and cover 22 except where specifically described otherwise below. Base 100 includes primary panel 30 and a side wall 104 extending therefrom with a generally perpendicular orientation relative to primary panel 30. Side wall 104 defines a hook or other suitable protrusion 106 extending from an edge 108 of side wall 104 opposite primary panel 30. Similarly, cover 102 includes primary panel 70 and a side wall 110 extending therefrom with a generally perpendicular orientation relative to primary panel 70. Side wall 110 defines an indentation or groove 112 extending toward primary panel 70 from an edge 114 of side wall 110 opposite primary panel 70. Groove 112 is configured to selectively receive protrusion 106 in a snap-fit connection to maintain base 20 coupled with cover 22 (i.e., to maintain housing 12 in a closed position) and to hermetically seal housing 12. Upon application of a suitable force(s) to one or both of base 20 and cover 22, groove 112 is configured to release protrusion 106 such that base 20 and cover 22 can be uncoupled (i.e., housing 12 can be opened) as desired by the bearer of transaction product 10.

Figure 4:
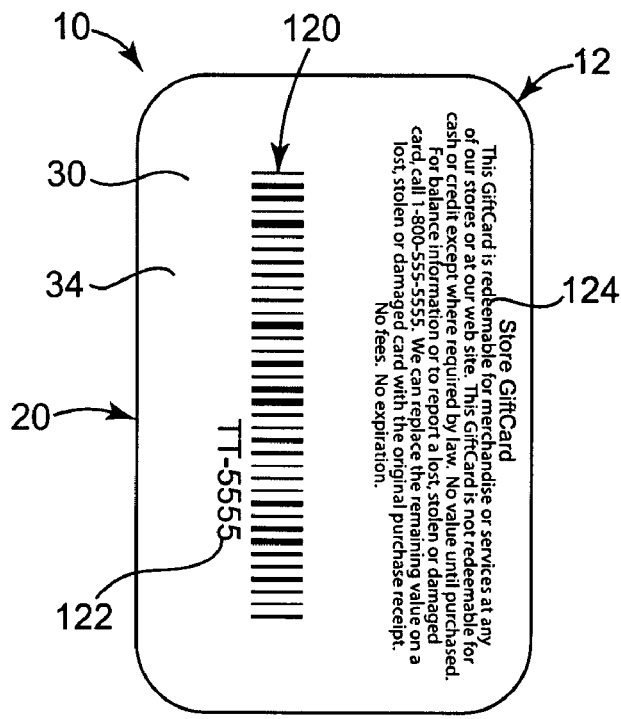
FIG. 4 is a rear view illustration of the transaction product of FIG. 1.
Figure 5:
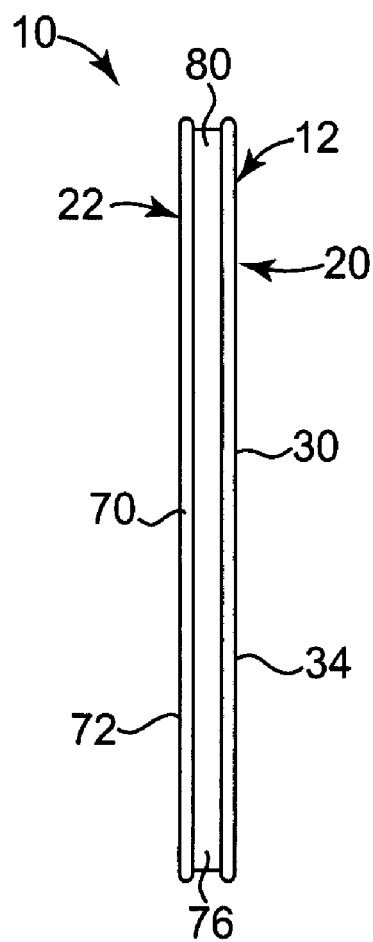
FIG. 5 is a right side view illustration of the transaction product of FIG. 1, the left side view being a mirror image thereof.
Figure 6:
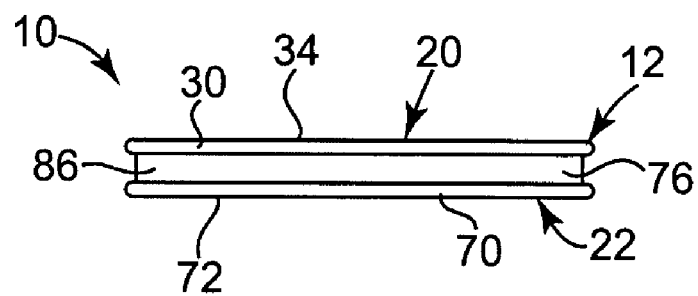
FIG. 6 is a top view illustration of the transaction product of FIG. 1, the bottom view being a mirror image thereof.

Referring to FIG. 4, housing 12 includes at least one activation area or account identifier 120 indicating an account or record linked with transaction product 10, for example printed or otherwise applied to outside surface 34 of base 20. Account identifier 120 indicates an account or record to which transaction product 10 is linked. The account or record maintains a monetary or non-monetary value or balance associated with transaction product 10 and is optionally stored on a database, other electronic or manual record-keeping system or in the case of "smart" cards for example, on a chip or other electronic device on transaction product 10 itself. Accordingly, by scanning or otherwise reading account identifier 120, the account or record linked to transaction product 10 is identified and can subsequently be activated and have amounts debited and/or added to the value associated therewith.

In one embodiment, account identifier 120 includes one or more of a bar code, magnetic strip, smart chip or other electronic device, radio frequency identification (RFID) device or other suitable marking readily readable by a point-of-sale terminal, account access station, kiosk or other suitable machine or device. In one embodiment, account identifier 120 includes a character string or code 122 (e.g., a number and or letter string) configured to provide additional security to the use of transaction product 10 and/or configured to be read by a bearer of transaction product 10 to facilitate use of transaction product 10 for web site or other purchases outside of a brick-and-mortar type retail establishments. With the above in mind, account identifier 120 is one example of means for linking transaction product 10 with an account or record, and scanning of account identifier 120 is one example of means for activating or loading value on transaction product 10.

In one embodiment, housing 12 additionally includes redemption indicia 124, which, in one example, are included on outside surface 34 base 20. Redemption indicia 124 indicate that transaction product 10 is redeemable for the purchase of goods and/or services and that, upon use, a value of the goods and/or services will be deducted from the account or record linked to transaction product 10. In one embodiment, redemption indicia 124 include phrases such as "<NAME OF STORE> GiftCard" and "This GiftCard is redeemable for merchandise or services at any of our stores or at our web site," and/or provides help or phone line information in case of a lost, stolen or damaged transaction product, etc.

In one embodiment, other indicia may also be included on outside surface 72 of cover 22 such as decorative indicia 126 and/or brand indicia 128. Decorative indicia 126 and brand indicia 128 may be applied to cover 22 in any suitable manner. For example, decorative indicia 126 and brand indicia 128 may be printed on or applied via printed label or sticker (not shown) applied to housing 12.

Figure 2:
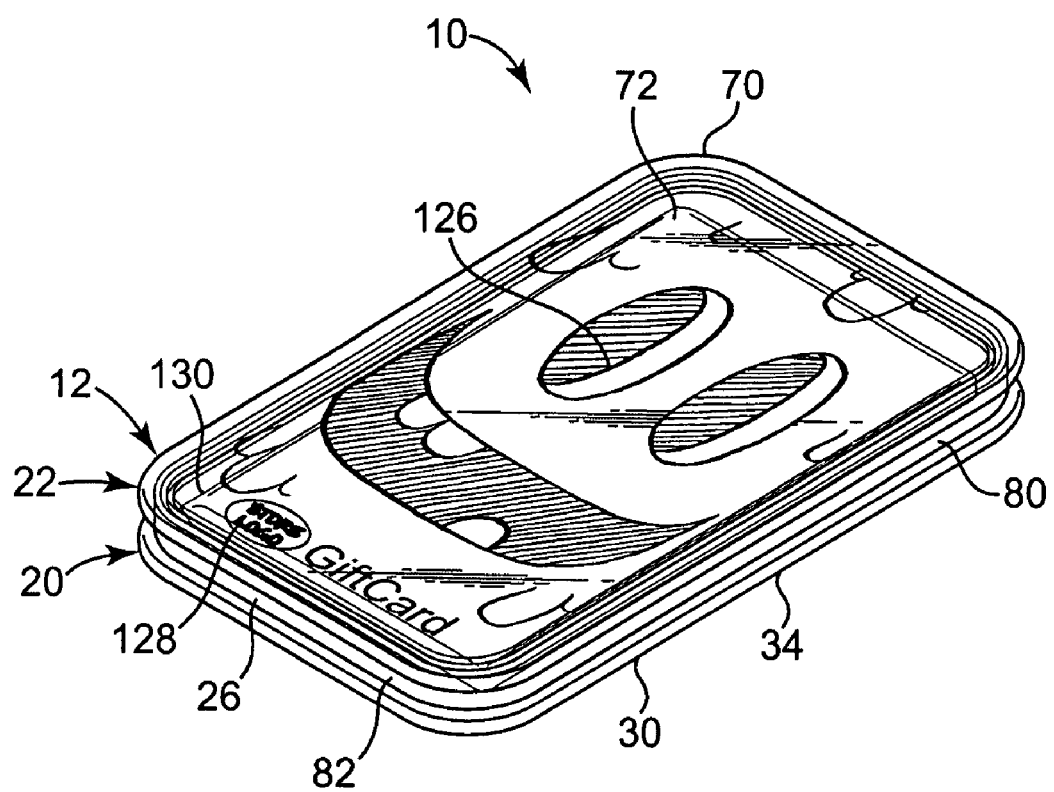
FIG. 2 is a perspective view illustration of the transaction product of FIG. 1, according to one embodiment of the present invention.
Figure 3:
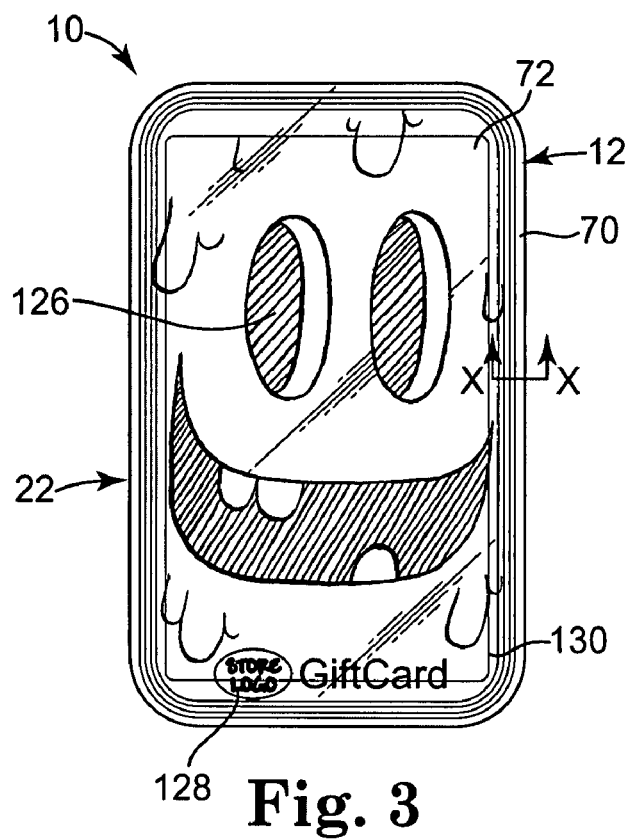
FIG. 3 is a front view illustration of the transaction product of FIG. 1.

For example, as illustrated in FIGS. 1-3, decorative indicia 126 are applied to outside surface 72 of primary panel 70, which in one embodiment, is substantially translucent or substantially transparent. More specifically, decorative indicia 126 are applied in a transparent or opaque manner to at least partially obscure full viewing of article 14 through primary panel 70. As such, decorative indicia 126 provide for aesthetic appeal of transaction product 10 while still allowing a potential consumer or other recipient to view the contents of housing 12 through the non-obscured or non-masked off portion of primary panel 70. In this respect, a dimensional visual effect is provided as decorative indicia 126 of cover 22 and article 14 can be viewed simultaneously.

Brand indicia 128 identify a brand associated with transaction product 10 such as identifying a product brand, a store brand or other indicia readily associated with a product or store etc. In one embodiment, brand indicia 128 are additionally or alternatively included on base 20.

Article 14 (FIG. 1) is any suitable substance or material configured to be selectively received by and maintained within housing 12. In one example, article 14 is a gelatinous substance or viscous material that is semi-fluid such that when article 14 is unconfined, article 14 is configured to flow or ooze in a plurality of directions. More particularly, in one embodiment, article 14 is a polyvinyl acetate (PVA) borax compound such as a substance formed of three percent PVA, three percent sodium borate and ninety-six percent distilled water. In such embodiments, article 14 is sticky and substantially deformable while being configured to generally return (e.g., gradually flow or ooze) to an initial configuration subject to any forces acting thereupon. In one example, the gelatinous substance is semi-solid such that the gelatinous substance can be grasped or otherwise manipulated by a bearer of the gelatinous substance to readily stretch or deform the gelatinous substance in a plurality of different directions. The sticky, flowable and readily deformable nature of the gelatinous substance makes article 14 amusing to all bearers of transaction product 10.

In one example, given the gelatinous properties of article 14, transaction product 10 may include a container or other package 130 separate from housing 12. For instance, in one example, package 130 is a bag configured to maintain article 14 such that article 14 and package 130 both are configured to be selectively maintained within housing 12. In one embodiment, package 130 serves to limit expansion of article 14 during exposure to high temperatures during manufacturing. For example, where article 14 is configured to expand upon exposure to temperature over 100° F. or more (e.g., over 120° F.), package 130 generally decreases such expansion. By decreasing article 14 expansion, package 130 decreases the likelihood that any of article 14 would undesirably ooze or otherwise migrate out of housing 12 during exposure to relatively high temperatures during manufacture, which could damage the machines through which transaction product 10 is being processed. In view of the above, package 130 is one example of means for containing article 14 separate from housing 12.

In one example, package 130 is a resealable plastic bag defining a storage chamber, which is generally indicated at 132 in FIG. 1, with a zip-like closure 134 as will be apparent to those of skill in the art upon reading this application. In one embodiment, package 130 is sized to have an overall shape slightly larger than the overall shape of storage cavity 24. However, package 130 is configured to be folded (e.g., along a fold line generally indicated at 136 in FIG. 1) prior to placement of package 130 and article 14 in housing 12. In one instance, package 130 is folded underneath a remainder of package 130, such that the remainder of package 130 filed with article 14 generally hides the zip-like closure 134 from view through housing 12, more specifically, through cover 22.

Notably, for illustrative purposes, only a portion of article 14 is illustrated through a cut-out portion of package 130 in FIG. 1. However, it should be understood, that in one embodiment, package 130 is one of substantially transparent and substantially translucent such that article 14 can be fully viewed through package 130 or at least a portion thereof. In one embodiment, package 130 is eliminated and article 14 is placed directly into housing 12.

In one embodiment, during assembly, article 14, either alone or with package 130, is placed between base 20 and cover 22 (i.e., within storage cavity 24) prior to assembly of housing 12. As such, in order to allow base 20 and cover 22 to still be assembled in a suitable manner, article 14 and, in one embodiment, package 130 is/are sized to fit entirely within storage cavity 24. In this manner, during placement of article 14 within housing 12, article 14 is in a first configuration in which the outer perimeter of article 14 is at least slightly smaller than the inside dimensions of side wall 36 of base 20. Furthermore, when in the first configuration, article 14 has a thickness less than a height of side wall 36 (i.e., a distance between inside surface 32 and inside edge 50) or side wall 76 (i.e. a distance between inside surface 74 and inside edge 88). In one embodiment, assembled housing 12 has a total thickness (i.e., a distance between outer surfaces of the first primary panel 30 and the second primary panel 70) of greater than 1 mm and, in one embodiment, greater than 3 mm.

Once article 14 is positioned, housing 12 is closed. For example, cover 22 is moved to slidably interface with base 20 such that side wall 76 extends around side wall 36 in a relatively tight manner to form a suitable hermetic seal around storage cavity 24. In one embodiment, coupling base 20 to cover 22 includes moving base 20 relative to cover 22 or vice versa such that inside edge 88 of side wall 76 abuts lip 52 of base 20 and/or inside edge 50 of base 20 abuts lip 92 of primary panel 70. In one example, upon initial closing of housing 12 prior to packaging, seal 96 (FIG. 8) is applied to extend around an outer perimeter of housing 12 between base 20 and cover 22.

Figure 10:
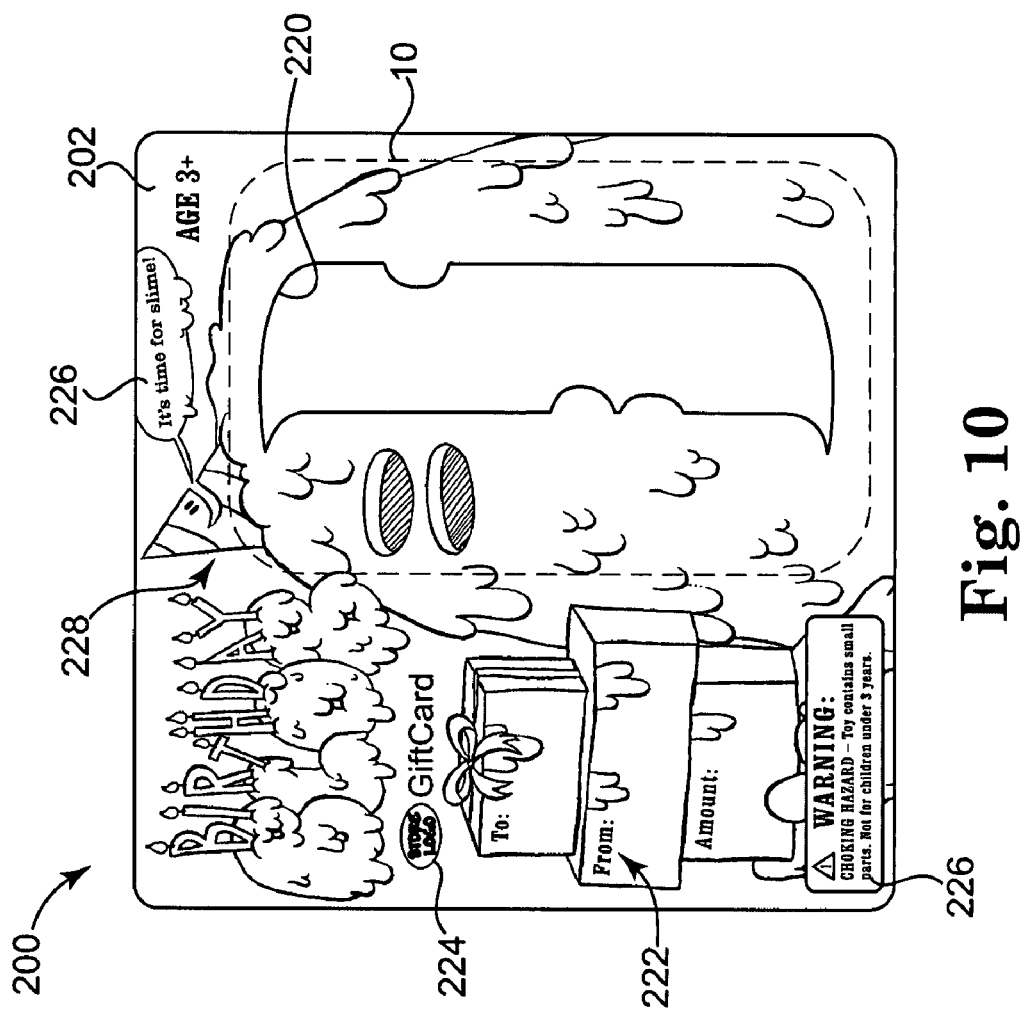
FIG. 10 is a front view illustration of a carrier for a transaction product, according to one embodiment of the present invention.
Figure 11:
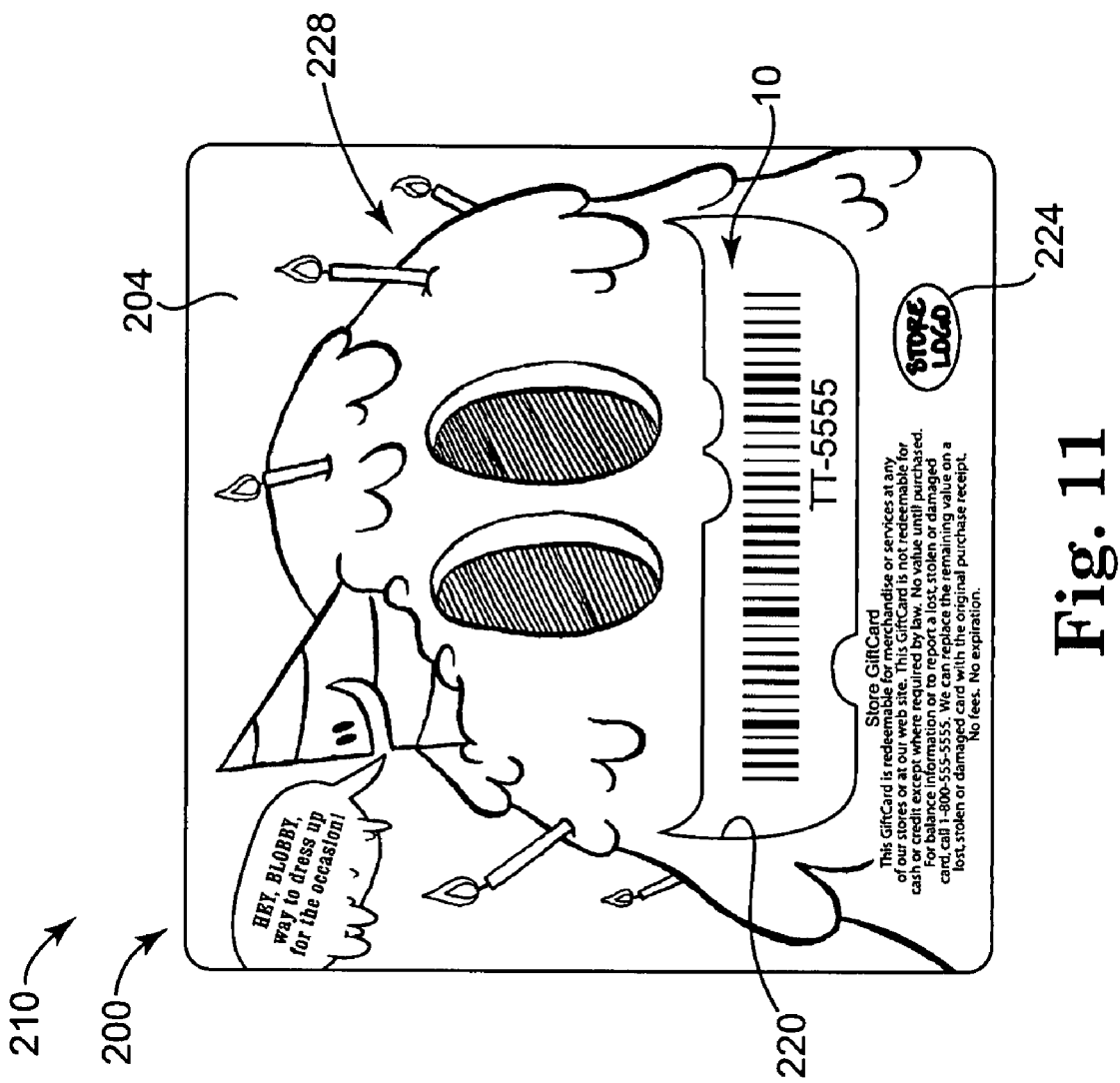
FIG. 11 is a back view illustration of a transaction product assembly including the carrier of FIG. 10 with the transaction product of FIG. 1, according to one embodiment of the present invention.

FIGS. 10 and 11 illustrate a carrier or backer 200 for supporting transaction product 10. In one embodiment, backer 200 comprises a single layer or multiple layers of paper or plastic material, for example, generally in the form of a relatively stiff card. As such, backer 200 defines a front surface 202 and a rear surface 204 opposite front surface 202. Transaction product 10 (represented in dashed lines on front surface 202 in FIG. 10 for illustrated purposes so as not to obstruct backer 200) is readily releasably attached to backer 200, for example, by removable adhesive, skinning or the like as will be further described below. Backer 200 and transaction product 10 collectively define a transaction product assembly 210 (FIG. 11).

Backer 200 defines a window or opening 220 for displaying account identifier 120 of transaction product 10 therethrough as illustrated in FIG. 11. As previously described, account identifier 120 is adapted for accessing the account or record associated with transaction product 10 for activating, loading or debiting values (e.g., monetary values, points, calling minutes, etc.) from the associated account or record. Accordingly, opening 220 allows viewing or other access to account identifier 120 to activate and/or load transaction product 10 without removing transaction product 10 from backer 200. In one embodiment, where no opening 220 is defined by backer 200 a portion of backer 200 is configured to be folded away from the remainder of backer 200 to access account identifier 120 without removing transaction product 10 from backer 200.

In one embodiment, backer 200 displays indicia, graphics or text information including one or more of store logo(s), store name(s), slogans, advertising, instructions, directions, brand indicia, promotional information, holiday indicia, seasonal indicia, media format identifiers, characters and other information. For example, indicia 222 include "to," "from" and/or "amount," fields. The fields of indicia 222 provide areas of backer 200 configured to be written upon by a consumer for personalization as a gift to a particular recipient, for a particular purpose and/or to indicate a value of transaction product 10.

Brand indicia 224 may also or alternatively be included to identify a store, brand, department, etc. and/or services associated with transaction product 10. Instructional indicia 226 include detailed information regarding use of transaction product 10 including identification of article 14 included within transaction product 10, as well as directions for usage of article 14, indications that article 14 is a toy, restrictions on recommended ages for playing with transaction product 10, etc.

In one example, backer 200 also includes decorative indicia 228 configured to enhance the aesthetic appeal of backer 200 and, in one embodiment, relating to the nature of article 14. Any of indicia 126 (FIG. 1), 128 (FIGS. 1, 2 and 3), 222, 224, 226, 228 or other indicia optionally may appear anywhere on backer 200 or transaction product 10. Additional information besides that specifically described and illustrated herein may also be included and/or one or more of indicia 126, 128, 222, 224, 226 and 228 may be eliminated.

Figure 12:
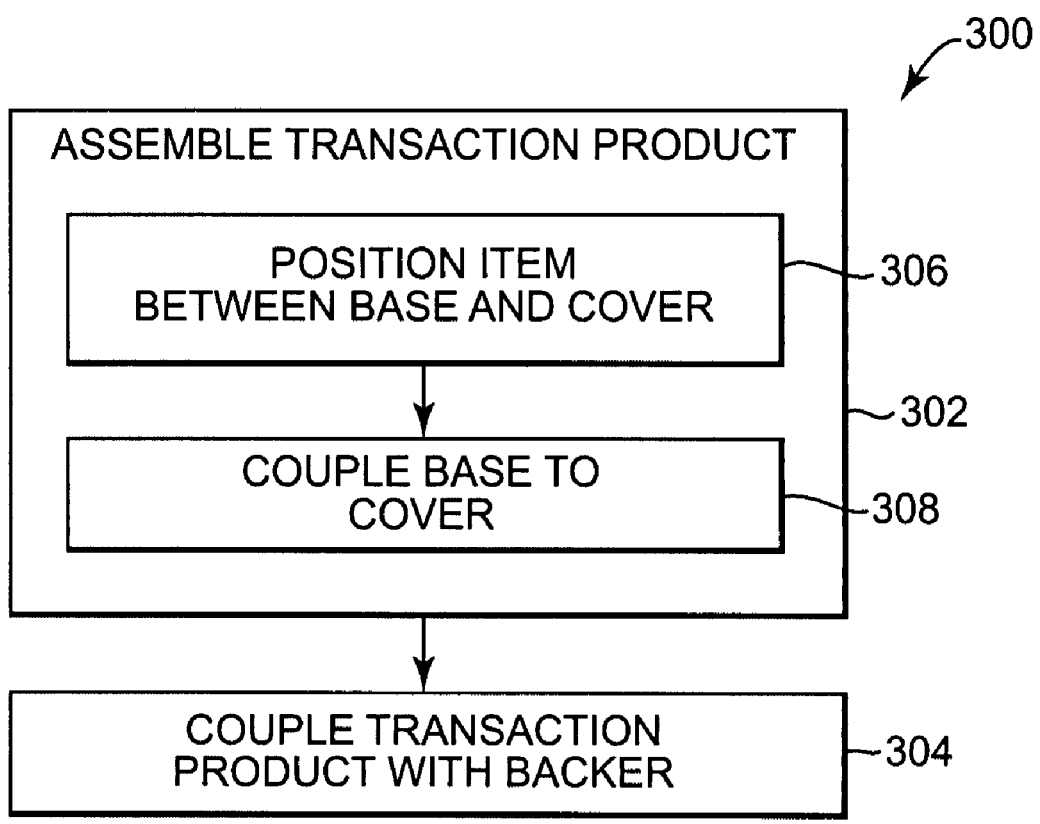
FIG. 12 is a flow chart illustrating a method of assembling a transaction product assembly, according to one embodiment of the present invention.

FIG. 12 is a flow chart illustrating one embodiment of a method 300 of assembling transaction product assembly 210. Additionally referring to FIGS. 1, 10 and 11, at 302, transaction product 10 is assembled, and, at 304, transaction product 10 is coupled with backer 200. More specifically, assembling transaction product 10 at 302 includes positioning article 14 within storage cavity 24 defined by housing 12, for example, between base 20 and cover 22 at 306. In one example, positioning article 14 within storage cavity 24 includes manipulating article 14 into a storage or first configuration and/or placing article 14 within package 130 and subsequently placing package 130 into storage cavity 24. In one embodiment, placing package 130 into storage cavity 24 includes folding package 130 along fold line 136 to hide a portion of package 130 such as the zip-like closure 134.

Subsequently, at 308, base 20 is coupled with cover 22. More specifically, cover 22 is positioned over base 20 such that primary panels 30 and 70 are substantially parallel to one another and is slid over side wall 36 of base 20. As cover 22 is moved toward base 20 (or vice versa), side wall 76 of cover 22 surrounds side wall 36. In one embodiment, when cover 22 is fully placed over base 20, inside edge 88 of cover 22 abuts or otherwise interfaces with lip 52 of base 20. As such, article 14 is housed between base 20 and cover 22 and, in one embodiment, is hermetically sealed within housing 12. In one example, seal 96 (FIG. 8) is placed around at least a portion of housing 12 to interface with base 20 and cover 22 to further secure cover 22 in place over base 20 and/or to indicate whether transaction product 10 has been tampered with prior to its purchase.

At 304, the assembled transaction product 10 is coupled with backer 200 to form a transaction product assembly 210 (FIG. 11). In one example, transaction product 10 is coupled to front surface 202 of backer 200 in a selectively releasable manner (e.g., with adhesive, shrink wrap or skinning material). In one embodiment, once transaction product 10 is coupled with backer 200, account identifier 120 of transaction product 10 is viewable through opening 220 of backer 200 as illustrated in FIG. 11. Following assembly at 300, transaction product assembly 210 is ready for retail or other display for sale to potential consumers.

Figure 13:
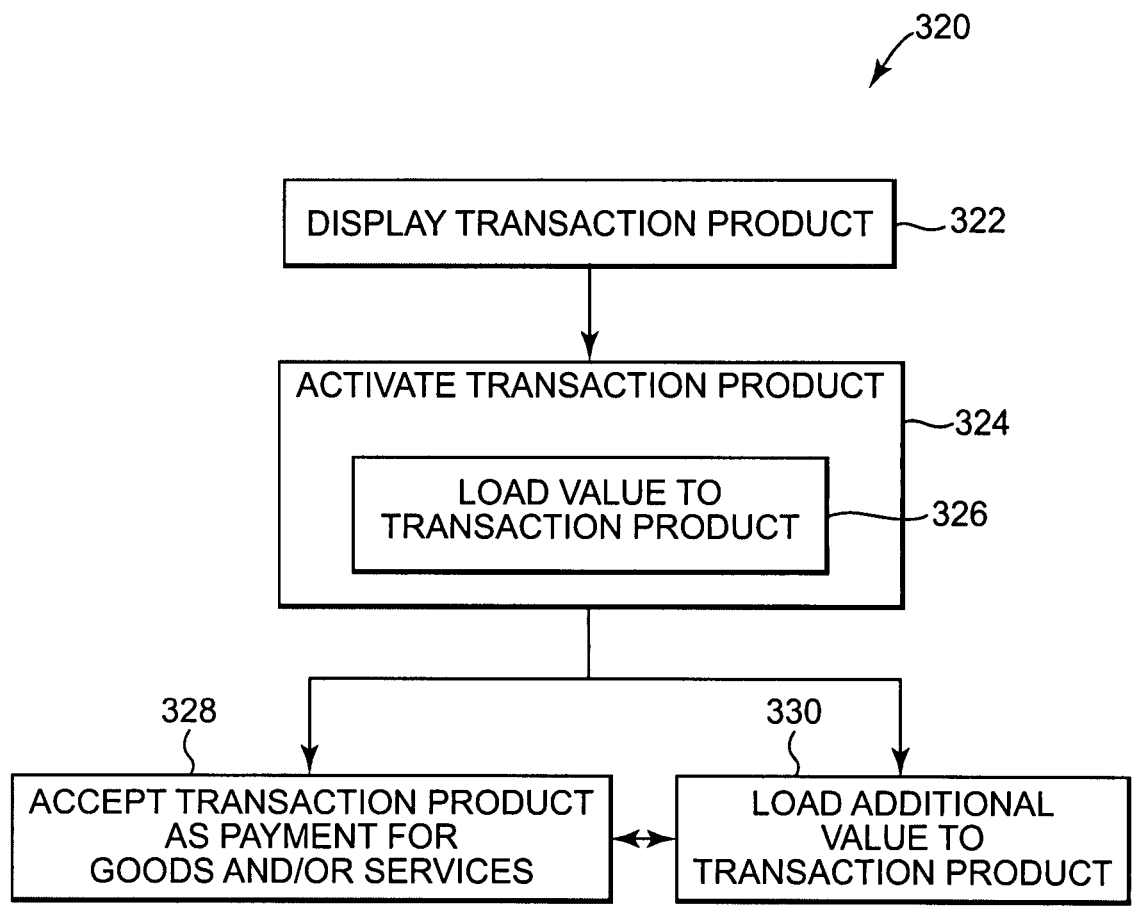
FIG. 13 is a flow chart illustrating a method of providing a transaction product for sale to and for use by consumers, according to one embodiment of the present invention.

FIG. 13 is a flow chart illustrating one embodiment of a method 320 of providing transaction product 10 for sale to and for use by consumers. At 322, transaction product 10 is displayed to potential consumers. For example, transaction product assembly 210, which includes transaction product 10, is placed on or hung from a rack, shelf or similar device to display transaction product assembly 210 in a retail setting such that transaction product 10 is visible to potential consumers. In one embodiment, transaction product 10 is displayed without backer 200 or a depiction of transaction product 10 is placed on a web site for viewing and purchase by potential consumers.

At 324, a consumer, who has decided to purchase transaction product 10, presents transaction product assembly 210, or at least transaction product 10, to a retail store employee, retail store kiosk or other person or device to scan or otherwise read account identifier 120 of transaction product 10 (e.g., through opening 220 in backer 200) to access the account or record linked to account identifier 120. Upon accessing the account or record, value is added to the account or record at 326. Thus, transaction product 10 is activated and loaded. In one embodiment, wherein a value is already associated with transaction product 10, operation 326 may be eliminated and activating transaction product 10 at 324 serves to unlock the account or record or otherwise make the predetermined value in the account or record available to a bearer of transaction product 10.

Once transaction product 10 is activated and/or loaded, transaction product 10 can be used by the consumer or any other bearer of transaction product 10 to purchase goods and/or services at the retail store or other affiliated retail setting or web site. In one embodiment, where transaction product 10 is displayed on a web site at 322, then, at 324, transaction product 10 may be activated in any suitable method and may be completed without machine scanning of account identifier 120. In one embodiment, transaction product 10 is activated and/or loaded remotely via a telephone or the internet.

At 328, the retail store or other affiliated retail setting, web site, etc. accepts transaction product 10 as payment toward the purchase or use of goods and/or services made by the current bearer of transaction product 10. In particular, the value currently loaded on transaction product 10 is applied toward the purchase of goods and/or services, toward the use of calling minutes, etc. At 330, additional value is optionally loaded on transaction product 10 at a point-of-sale terminal, kiosk, other area of the retail store or related setting or via a web site or by telephone. Upon accepting transaction product 10 as payment at 328, the retail store or related setting can subsequently perform either operation 328 again or operation 330 as requested by a current bearer of transaction product 10. Similarly, upon loading additional value to transaction product 10 at 330, the retail store or related setting can subsequently perform either operation 330 again or operation 328. In one example, the ability to accept transaction product 10 as payment for or toward use of goods and/or services is limited by whether the account or record associated with transaction product 10 has any value at the time of attempted redemption.

Figure 14:
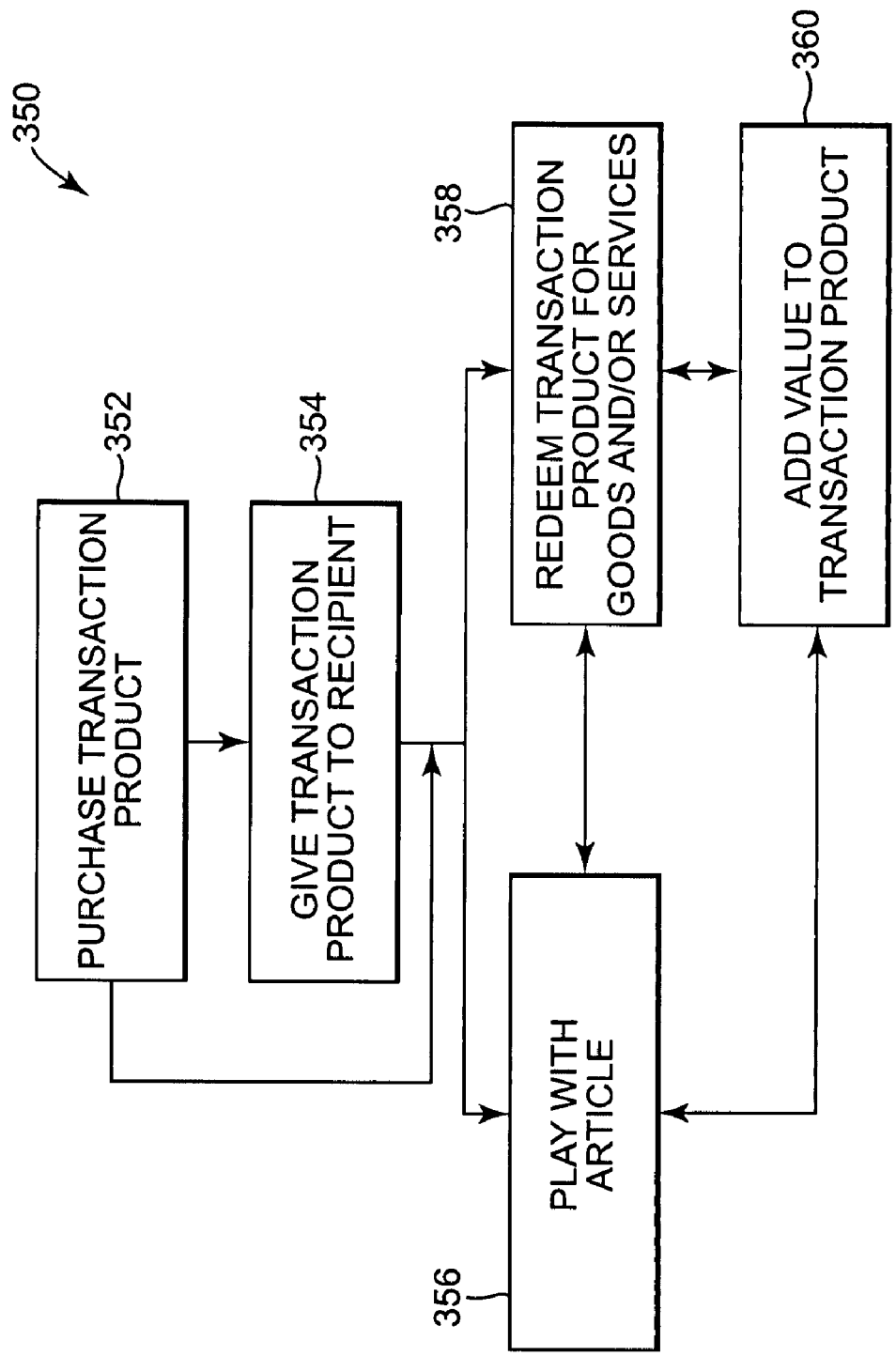
FIG. 14 is a flow chart illustrating a method of using a transaction product, according to one embodiment of the present invention.

FIG. 14 is a flow chart illustrating one embodiment of a method 350 of using transaction product 10. At 352, a potential consumer of transaction product 10, which is displayed in a retail store or viewed on a web site, decides to and does purchase transaction product 10 from the retail store or web site setting. Transaction product 10 can be displayed and purchased alone or as part of the transaction product assembly 210. Upon purchasing of transaction product 10, a retail store employee, retail store kiosk or other person scans account identifier 120 to activate or load value onto transaction product 10. In one embodiment, such as where transaction product 10 is purchased at 352 via a web site, actual scanning of account identifier 120 may be eliminated.

At 354, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, bridal shower, etc. as party favors or gifts. As an alternative, the consumer can keep transaction product 10 for his or her own use thereby eliminating operation 354.

At 356, the consumer or recipient, whoever is in current ownership or otherwise is the current bearer of transaction product 10, uses transaction product 10 for reasons unrelated to its stored-value or transactional functionality. More specifically, the bearer initially removes transaction product 10 from backer 200, if transaction product 10 is coupled with backer 200, and opens housing 12 by separating cover 22 from base 20 to access storage cavity 24 and any article 14 maintained therein. The bearer can use article 14 as they see fit dependent upon the particular nature of article 14 or can otherwise use housing 12 as a storage device.

In one example, where article 14 includes a gelatinous substance, article 14 can be removed from housing 12 and can subsequently be stretched or deformed from the storage or first configuration into a plurality of other configurations each differing from the first configuration as desired by the bearer of transaction product 10. In one example, a bearer enjoys the viscous nature of article 14 by temporarily sticking article 14 to any available surface, etc. Following play, article 14 may be returned to the storage or first configuration, replaced within storage cavity 24 and hermetically sealed to protect article 14 for future use.

At 358, the current bearer of transaction product 10 redeems transaction product 10 for goods and/or services from the retail store or web site. At 360, the current bearer of transaction product 10 optionally adds value to transaction product 10 or, more particularly, to the account or record associated with transaction product 10, at the retail store, over the Internet or via telephone. Upon removing and using article 14 of transaction product 10 from housing 12 at 356, redeeming transaction product 10 at 358 or adding value to transaction product 10 at 360, the current bearer of transaction product 10 subsequently can perform any of operations 356, 358 or 360 as desired. More specifically, since account identifier 120 and any other information necessary to redeem transaction product 10 is included on housing 12, in one example, only housing 12 is used to perform operations 358 and 360 such that operations 358 and 360 can be performed regardless of whether article 14 is currently stored in housing 12. In one embodiment, the ability of the current bearer to repeat redeeming transaction product 10 at 358 is limited by whether the account or record associated with transaction product 10 has any value at the time of attempted redemption.

Although described above as occurring at single retail store or web site, in one embodiment, purchasing transaction product 10 at 352, redeeming transaction product 10 at 358 and adding value to transaction product 10 at 360, can each be performed at any one of a number of stores adapted to accept transaction product 10 or over the Internet. In one example, the number of stores are each a part of a chain or similarly branded stores. In one example, the number of stores includes at least one web site and/or at least one conventional brick and mortar store.

Stored-value cards and other transaction products come in many forms, according to embodiments of the invention. The gift card, like other stored-value cards, can be "recharged" or "reloaded" at the direction of the original consumer, the gift recipient or third party. The term "loading on" or "loaded on" herein should be interpreted to include adding to the balance of an account or record associated with a stored-value card. The balance associated with a stored-value card declines as the card is used, encouraging repeat visits. The card remains in the user's purse or wallet, serving as an advertisement or reminder to revisit the associated merchant. Gift cards, according to an embodiment of the invention, provide a number of advantages to both the consumer and the merchant. Other transaction products according to embodiments of the invention include loyalty cards, merchandise return cards, electronic gift certificates, employee cards, frequency cards, pre-paid cards and other types of cards associated with or representing purchasing power or monetary value, for example.

Although the invention has been described to particular embodiments, such embodiments are for illustrative purposes only and should not be considered to limit the invention. Various alternatives and modifications within the scope of the invention in its various embodiments will be apparent to those with ordinary skill in the art.

What is claimed is:

1. A transaction product comprising: a housing defining a storage cavity, wherein the housing is configured to be repeatedly opened and closed to provide selective access to the storage cavity; a gelatinous substance selectively enclosed within the storage cavity, wherein, upon removal of the gelatinous substance from the storage cavity, the gelatinous substance is configured to selectively flow in a plurality of different directions; and an account identifier linking the transaction product to at least one of an account and a record, the account identifier being machine readable by a point-of-sale terminal such that value can be added to or deducted from the at least one of the account and the record using the account identifier.

2. The transaction product of claim 1, wherein the account identifier includes at least one of a bar code, a magnetic strip, an electronic device and a radio frequency identification device.

3. The transaction product of claim 1, wherein the gelatinous substance is a polyvinyl acetate borax compound.

4. The transaction product of claim 1, wherein the gelatinous substance is substantially in a first configuration when enclosed within the housing, and wherein, when removed from the housing, the gelatinous substance can be stretched into a plurality of configurations each differing from the first configuration, the gelatinous substance being able to flow from any one of the plurality of configurations substantially back to the first configuration for replacement of the gelatinous substance within the storage cavity.

5. The transaction product of claim 1, wherein the housing includes a portion that is one of substantially transparent and substantially translucent such that the gelatinous substance can be viewed through the portion without removing the gelatinous substance from the storage cavity.

6. The transaction product of claim 1, wherein the housing includes a base and a cover selectively coupled to one another when the housing is closed to define the storage cavity therebetween, the base and the cover being uncoupled from one another when the housing is opened.

7. The transaction product of claim 6, wherein, when the housing is closed, a wrap initially extends around a perimeter of the housing further maintaining the base and the cover coupled to one another.

8. The transaction product of claim 6, wherein the base and the cover form an air tight seal around the storage cavity when the base and the cover are coupled to one another.

9. The transaction product of claim 8, wherein the base and the cover are coupled to one another with a snap-fit connection.

10. The transaction product of claim 8, wherein the base and the cover are coupled to one another with a friction-fit connection.

11. The transaction product of claim 8, wherein the housing including the air tight seal around the storage cavity protects the gelatinous substance from drying out when the transaction product is exposed to at least 170° F. for 168 continuous hours while the gelatinous substance is in the storage cavity and the housing is closed.

12. The transaction product of claim 1, further comprising a package containing the gelatinous material, wherein the package and the gelatinous material are selectively maintained in the storage cavity.

13. The transaction product of claim 12, wherein the package is a substantially transparent and resealable bag configured to decrease expansion of the gelatinous substance upon exposure of the transaction product to temperatures greater than 100° F.

14. A stored-value card, comprising:
a gelatinous article that is flowable in a plurality of directions;
means for enclosing the gelatinous article, wherein the means for enclosing hermetically seals the gelatinous article within the means for enclosing to decrease an impact of environmental factors on the gelatinous article while the gelatinous article is enclosed within the means for enclosing; and
means for linking the stored-value card to an account or record indicating a value associated with the stored-value card, the means for linking being coupled to the means for substantially enclosing.

15. The stored-value card of claim 14, further comprising means for supporting the means for enclosing, the means for supporting including means for providing access through the means for supporting to the means for linking.

16. The stored-value card of claim 14, wherein the means for enclosing includes two members selectively coupled to one another to enclose and hermetically seal the gelatinous article therebetween.

17. The stored-value card of claim 14, wherein the gelatinous article is a semi-fluid gelatinous material.

18. The stored-value card of claim 14, further comprising means for containing the gelatinous article, wherein the means for containing the gelatinous article is configured to be selectively opened and readily resealable, and the means for enclosing the gelatinous article selectively encloses the means for containing the gelatinous article.

19. A method of encouraging purchase and facilitating use of a transaction card, the method comprising:

displaying the transaction card including a substantially rigid enclosure maintaining a semi-fluid viscous material, wherein the enclosure is configured to be repeatedly opened and closed and wherein the transaction card includes an activation area linking the transaction card to at least one of an account and a record, and wherein displaying the transaction card includes indicating that the semi-fluid viscous material is housed within the enclosure and is a toy; and activating the transaction card to permit deductions from the at least one of the account and the record including machine reading the activation area to determine the at least one of the account and the record linked to the transaction card.

20. The method of claim 19, wherein displaying the transaction card includes displaying the transaction card coupled to a carrier, which supports the transaction card, the carrier including indicia indicating that the semi-fluid viscous material is housed within the enclosure and is the toy.

21. The method of claim 19, further comprising receiving the transaction card as payment for goods or services, at least a portion of a value of the goods or services being deducted from the at least one of the account and the record.

22. The method of claim 19, wherein the semi-fluid viscous material is hermetically sealed within the enclosure during displaying of the transaction card.

23. A method of forming a stored-value product, the method comprising: placing a flowable, gelatinous material into a first housing member; coupling a second housing member with the first housing member to enclose and hermetically seal the flowable, gelatinous material between the first housing member and the second housing member, wherein the first housing member and the second housing member are configured to be repeatedly coupled and decoupled; and associating an account identifier with one of first housing member and the second housing member, the account identifier linking the transaction product to an account or record having an associated value.

24. The method of claim 23, wherein placing the flowable, gelatinous material into a first housing member includes packaging the flowable, gelatinous material in a container and placing the container with the flowable, gelatinous material into the first member.

* * * * *